UNITED STATES PATENT OFFICE.

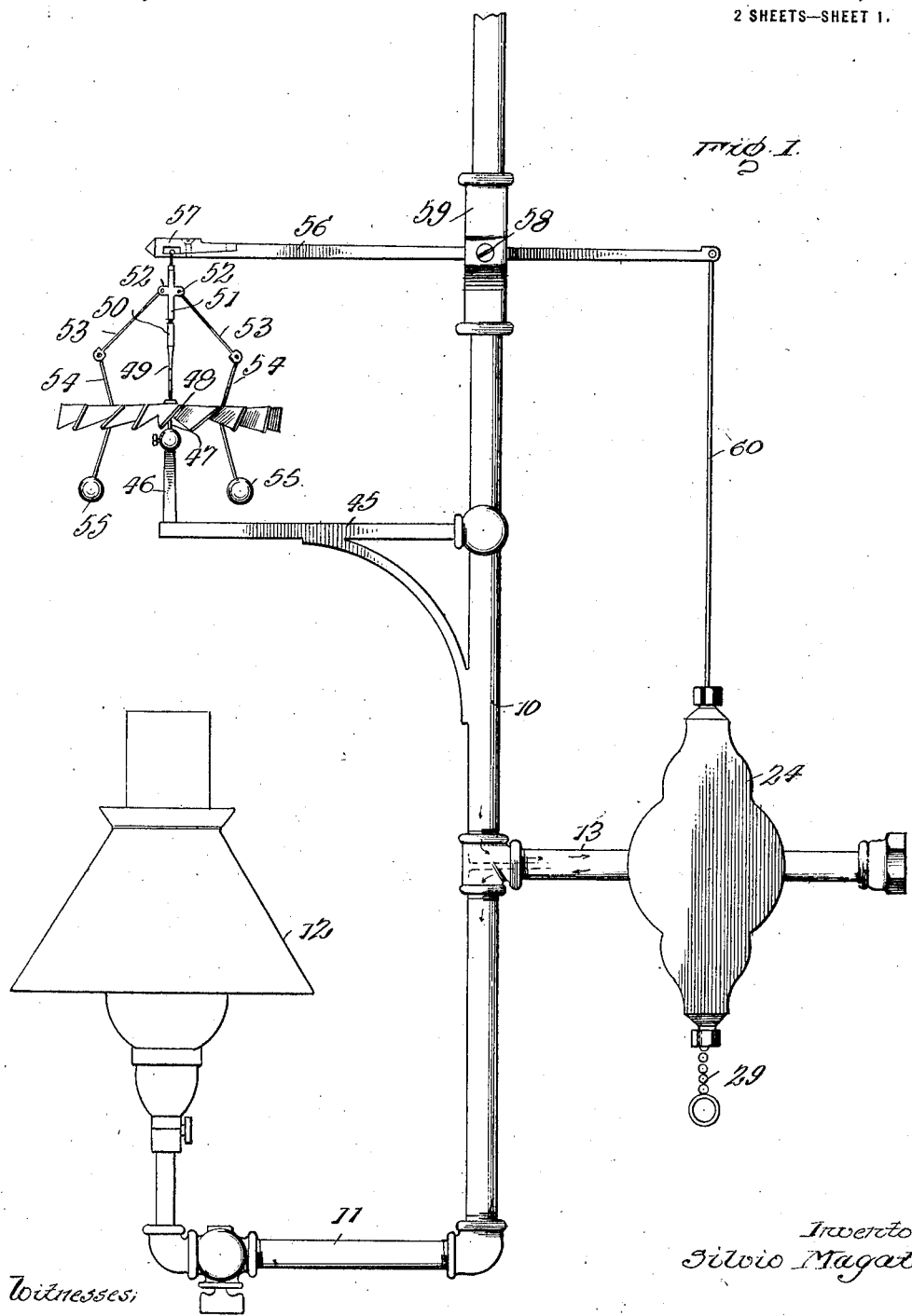

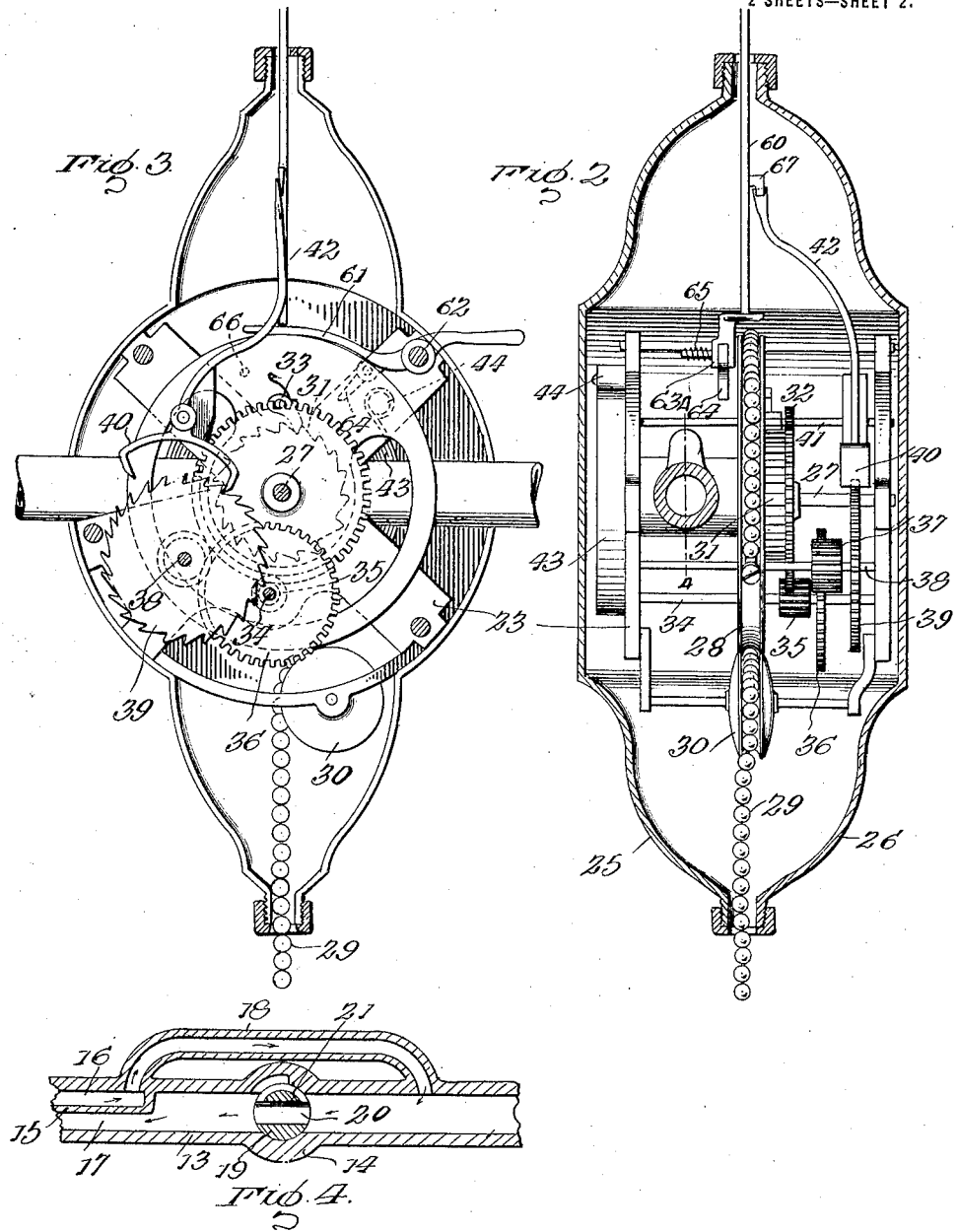

SILVIO MAGATON, OF BROOKLYN, NEW YORK.

SAFETY GAS CUT-OFF.

1,321,656.  Specification of Letters Patent.  Patented Nov. 11, 1919.

Application filed March 17, 1919. Serial No. 283,134.

*To all whom it may concern:*

Be it known that I, SILVIO MAGATON, a subject of the King of Italy, residing at Brooklyn, in the county of Kings and State of New York, have invented certain new and useful Improvements in Safety Gas Cut-Offs, of which the following is a specification.

This invention has relation to safety devices for illuminating gas fixtures or the like, and has for an object to provide means for shutting off and preventing the escape of gas from the fixture in the event that the light, heating apparatus or other fixtures become extinguished or fail to function from any cause whatsoever.

In addition to the foregoing, this invention comprehends improvements in the details of construction and arrangement of parts, to be hereinafter described and particularly set forth in the appended claims.

In the accompanying drawings in which similar and corresponding parts are designated by the same characters of reference throughout the several views in which they appear—

Figure 1 is a view in side elevation of a gas fixture embodying my improvements.

Fig. 2 is a vertical section taken through the valve operating mechanism.

Fig. 3 is a vertical section taken on the line 3—3 of Fig. 2, and

Fig. 4 is a detail section taken on the line 4—4 of Fig. 2.

With reference to the drawings, 10 indicates a depending pipe of a gas fixture having a horizontal extension 11 upon which the lamp 12 is mounted. A branch 13 is led from the pipe 10 at a point above the extension 11 and oppositely thereto, said branch having a valve casing 14 formed therein. A horizontal partition 15 is formed within the branch 13 and extends from the pipe 10 to a point adjacent the valve casing defining an upper channel 16 and a lower channel 17. Said channel 16 communicates with the interior of the pipe 10 above the point of connection thereto of the branch 13 while the channel 17 communicates with the interior of the pipe 10 at a point below said point of connection. A by pass tube 18 is provided having one end communicating with the channel 16 at one side of the valve casing while its other end communicates with the channel 17 at the other side of the valve casing. The valve casing is bored transversely to receive a turn plug valve 19 having a transverse port 20 and a semi-circumferential groove 21 on the outside of the valve connecting the ends of the port. A groove 22 is also formed in the upper surface of the valve seat for a purpose to be presently seen. The valve casing 14 is mounted in a frame 23 which is inclosed within a casing 24 formed in separable halves 25 and 26. The turn plug 19 is mounted on a shaft 27 journaled in the frame and loosely mounted on said shaft is a large pulley 28. A chain 29 is passed around the pulley with one end being passed over a guide pulley 30 and down through an opening in the lower end of the casing 24. Fixedly mounted upon the shaft 27 is a ratchet wheel 31 and a gear wheel 32, both of them being fixedly connected together for rotation in unison. A spring pawl 33 is mounted upon the pulley 28 to engage said ratchet. A shaft 34 is mounted in the frame and carries a gear 35 which is in engagement with the gear 32, said shaft 34 also carrying a gear 36 which is in meshing engagement with a pinion 37 mounted upon a shaft 38 also journaled in the frame. The shaft 38 carries an escapement wheel which coöperates with an escapement lever 40 mounted upon the shaft 41 which is journaled in the frame, and said escapement lever 40 carries an upwardly extending curved finger 42 having its upper end located adjacent the vertical center of the casing 24 for a purpose to be presently obvious. A spiral spring 43 is provided having one end secured to the frame as at 44, and its inner end secured to the shaft 27.

Extending from the vertical pipe 10 in a horizontal direction is an arm 45 having its upper end located above the lamp 12 and carrying an upstanding post 46 which is provided with an adjustable pin 47 forming a support for a wind wheel 48, the latter having a vertical shaft 49 which is formed with a sleeve 50 at its upper end. Extending into the sleeve 50 is the reduced end of a vertical spindle 51 having a pair of oppositely extending arms 52 formed thereon. Extending in pivotal relation from the arm 52 are links 53 having their outer ends pivotally connected to bell cranks 54, the latter being pivoted at points intermediate their ends upon the wind wheel 48 and carrying at their lower ends weight or balls 55. The upper end of the spindle 51 is reduced and engaged in a laterally extending notch formed in one end of a balance lever 56, a removable block 57 being secured to said balance lever and likewise having a notch to receive the upper end of the spindle 52 thereby acting in conjunction to loosely support the upper end of said spindle. The extremity of the reduced portion of the spindle 51 is enlarged to prevent withdrawal thereof from the notches. The balance 56 is fulcrumed as at 58 in a bifurcated portion 59 of the stand pipe 10, while its opposite end has pivotally connected thereto a depending rod 60 which enters the upper end of the casing 24. The lower end of the rod 60 normally rests upon a finger 61 which is pivoted at 62 upon a shaft mounted in the frame 23 within said casing 24, and formed with said finger 61 is a pair of ears 63 between which a pawl 64 is mounted. The pivotal point of the pawl 64 is extended and a coiled spring 65 is wrapped thereabout to normally urge said pawl in one direction. The pin 66 extends laterally from the pulley 28 whereby to engage said pawl during rotation of the pulley, the pawl being constructed so as to move against the tension of the spring 65 when engaged at one side and to resist said movement when engaged at the other side to cause corresponding movement of finger 61. Laterally extending from the rod 60 is a finger 67 which is engageable by the upper end of the finger 42 as shown in Fig. 2.

In a normal position of the valve 19 the channel 17 is cut off and hence no gas can pass into the lower end of the standpipe 10 nor enter the lamp 12. In order to light the gas at the lamp it is but necessary to draw down upon the chain 29 causing rotation of the pulley 28 which is communicated to the shaft 27 thereby rotating the valve 19 to an open position shown in Fig. 4, wherein the bore 20 is parallel to the channel 17 to permit the gas to enter the lamp, flowing from the upper section of the pipe 10, through the channel 16, by pass 18 into the channel 17, through the valve 19 and thence into the lower section of the stand pipe 10. As soon as the lamp is illuminated the upward current of air which occurs above the lamp 12 results in rotation of the wind wheel 48, and as a result of such rotation the weights 55 are swung outward, causing the spindle 51 to raise and thereby rock the balance arm 56 causing the rod 60 to descend until the finger 67 engages the finger 42. It will be obvious that as soon as the chain 29 is released the coiled spring 43 acting through the shaft 27, pulley 28 rotation of which is communicated through the pawl 33 to the ratchet 31 and hence the gear wheel 32, and through the gearing 35, 36, 37, and 39 in the order named to rapidly oscillate the escapement lever 40. When the rod 60 descends as previously stated bringing the finger 57 into the path of movement of the upper end of the vibrating rod 42, motion of the escapement lever immediately ceases, causing cessation of movement of all of the gearing and consequently the valve 19 will be retained in an open position. It will be obvious that the valve 19 is capable of completing three quarters of a revolution before returning to its original position to cut off further supply of gas. Hence, since the operation of the gearing is slow when controlled by movement of the escapement lever ample opportunity is given to ignite the lamp and cause operation of the wind wheel with the consequent operation of the parts as described above.

From the foregoing it will be obvious that should the lamp 12 be extinguished by draft of air, a decrease in gas pressure or for absolutely any reason whatsoever the upward current of air will cease and consequently the wind wheel 48 will stop rotating. As a consequence thereof the balls 55 will move toward each other causing the arm 56 to move downward producing a reversal of operation as described above thereby drawing upward upon the rod 60 and permitting the finger 42 to rapidly oscillate and to permit the valve 19 to gradually close under the influence of the spring 43.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention, what I claim as new and desire to secure by United States Letters Patent is:

1. A gas fixture including a pipe, a bracket extending therefrom, a vertical spindle mounted on said bracket, a windwheel carried by said spindle, a pair of pivoted arms carried by said windwheel having their ends weighted, a member vertically movable on said spindle, links connecting said member with the arms, a lever fulcrumed upon the pipe and having one end loosely connected with the movable member, a valve for controlling passage through the pipe, a clock work mechanism including an escapement adapted to move the valve to close position, and a rod carried by the other end of the lever and engaging said escapement mechanism to prevent operation thereof during the rotation of the windwheel.

2. A gas fixture including a pipe, a branch extending therefrom divided into parallel channels communicating with the ends of the pipe, a valve controlling communication between said channels, a clock work mechanism adapted to urge the valve to close position, a windwheel, and means operable during rotation of the windwheel to normally prevent operation of the clock work mechanism.

3. A gas fixture including a pipe, a valve to control the passage thereof, a ratchet wheel movable with the valve, a pulley, a pawl mounted on the pulley for engaging the ratchet, and an escapement mechanism, a train of gears between the pulley and escapement mechanism, a flexible element wound about the pulley for rotating the same, a depending rod engaging the escapement mechanism to prevent operation thereof, a windwheel, and means operable during rotation of the windwheel to retain said rod in such engagement.

In testimony whereof I affix my signature.

SILVIO MAGATON. [L. S.]

Copies of this patent may be obtained for five cents each, by addressing the "Commissioner of Patents, Washington, D. C."